United States Patent [19]
Duvall et al.

[11] Patent Number: 5,723,433
[45] Date of Patent: Mar. 3, 1998

[54] SOVENT REMOVAL PROCESS

[75] Inventors: Lanny R. Duvall, Kent; Burton Brooks, Bellevue; Walter Jessup, Seattle, all of Wash.

[73] Assignee: The Chemithon Corporation, Seattle, Wash.

[21] Appl. No.: 475,046

[22] Filed: Jun. 7, 1995

Related U.S. Application Data

[63] Continuation-in-part of Ser. No. 126,490, Sep. 24, 1993, abandoned.

[51] Int. Cl.$^6$ ............................ C11D 11/00; B01D 1/14; B01D 1/28; F26B 7/00
[52] U.S. Cl. .......................... 510/457; 34/402; 34/403; 159/2.1; 159/16.3; 159/46; 159/47.1; 159/DIG. 16; 203/18; 203/88; 203/92; 203/95
[58] Field of Search ....................... 252/89.1, 170, 252/174; 34/402, 403; 159/2.1, 16.3, 46, 47.1, DIG. 16; 203/18, 21, 88, 92, 95; 510/457, 443, 452

[56] References Cited

U.S. PATENT DOCUMENTS

| | | | |
|---|---|---|---|
| 2,710,057 | 6/1955 | Bassett et al. | 159/47 |
| 3,703,772 | 11/1972 | McHugh et al. | 34/9 |
| 4,285,881 | 8/1981 | Yang | 260/458 |
| 4,430,156 | 2/1984 | Casper et al. | 159/47.1 |
| 4,515,707 | 5/1985 | Brooks | 252/368 |
| 4,696,767 | 9/1987 | Novakovic et al. | 252/557 |
| 4,906,329 | 3/1990 | Tominari et al. | 159/47.1 |
| 4,963,226 | 10/1990 | Chamberlain | 159/48.1 |
| 5,052,122 | 10/1991 | Ishikawa et al. | 34/5 |
| 5,160,580 | 11/1992 | Sassi | 159/47.1 |

FOREIGN PATENT DOCUMENTS

| | | |
|---|---|---|
| 0 045 912 | 2/1982 | European Pat. Off. |
| 0 123 812 | 11/1984 | European Pat. Off. |
| 0 349 200 | 1/1990 | European Pat. Off. |
| 0 402 112 | 12/1990 | European Pat. Off. |
| 0 508 543 A1 | 10/1992 | European Pat. Off. |
| 48-103082 | 12/1973 | Japan . |
| 51-41675 | 4/1976 | Japan . |
| 63-315101 | 12/1988 | Japan . |
| 1-46161 | 10/1989 | Japan . |
| 2-222498 | 9/1990 | Japan . |
| 276903 | 7/1970 | U.S.S.R. |
| 945316 | 12/1963 | United Kingdom . |
| WO92/18603 | 10/1992 | WIPO . |

OTHER PUBLICATIONS

Maekawa et al., "Flash Vacuum Drying System 'Crux System'—Application in the Preparation of Superfine Micropowder and the Surface Treatment of Microparticles," *Funsai (Grinding)*, No. 35, pp. 32–38 (1991); and English translation thereof.

*Primary Examiner*—Paul Lieberman
*Assistant Examiner*—Lorna M. Douyon
*Attorney, Agent, or Firm*—Marshall, O'Toole, Gerstein, Murray & Borun

[57] ABSTRACT

A method of removing solvents from a paste includes introducing a heated paste into a channel of a dryer under pressure selected so as to avoid flashing of any of the components of the paste. At the inlet of the channel, the pressure is dropped, resulting in the flashing of selected components of the paste. As the paste advances through the channel heat is applied to the paste. Vapor liberated during the flashing acts as a motive force to convey the paste along the channel. The resulting concentrate is collected at an outlet of the channel.

15 Claims, 1 Drawing Sheet

SOVENT REMOVAL PROCESS

CROSS REFERENCE TO RELATED APPLICATION

This is a continuation-in-part of commonly assigned application Ser. No. 08/126,490 filed Sep. 24, 1993 now abandoned.

BACKGROUND OF THE INVENTION

1. Field of the Invention

The invention relates to processes for removing solvents from materials such as solutions, dispersions or slurries, emulsions, and pastes, and in particular the invention relates to processes for removing solvents from detergent pastes.

2. Description of Related Technology

Detergent products contain surface active ingredients (sometimes referred to as "detergent actives"), which may be neutralized salts of acids produced for example, by sulfating or sulfonating an organic material. The process of making detergent actives from the acid form is typically performed in a solvent, such as water and/or alcohol. The resulting detergent material may be a paste, a solution or a slurry of various components. (The term detergent "paste" as used throughout the application is meant to include detergent solutions, dispersions or slurries, and pastes). Final detergent products are made from detergent pastes.

One of the most common products, a laundry powder, is prepared by drying a paste containing the desirable detergent actives, other by-products, various salts, detergent builders and from about 30 wt. % to about 80 wt. % water (most preferably from about 30 wt % to about 45 wt. % water). The paste ingredients must be compatible with each other and insensitive to the drying process.

A conventional method to produce a detergent powder by removing water from a detergent paste involves spraying the detergent paste counter-currently or co-currently with hot air in a spray-drying tower. This process most often yields a free-flowing, low density (approximately 0.3 specific gravity) granule.

Since water removal in the spray-drying process requires heating and exhausting large amounts of air, the process tends to be energy expensive. Some conventional spray-drying processes also cause detergent actives and heat sensitive builders to undergo physical and chemical degradation because of the severe drying conditions in certain areas of the spray-drying tower.

Environmental concerns are another factor. In conventional spray-drying, the exhaust gasses may contain volatile organic material and particulates. Pollution control measures are therefore required. In some processes, when phosphate builders are employed, over drying of the paste causes the formation of undesired phosphorus compounds in the product. This contributes to water pollution problems.

Other processes for producing detergent powders do not utilize spray-drying. For example, the acid form of a detergent active may be dry-neutralized with finely granulated sodium carbonate. Excess sodium carbonate and phosphorus compounds are required for this process to facilitate the absorption and neutralization of the acid. The resulting product is often restricted to low concentrations of detergent actives in the final product.

A trend in the detergent industry has been to utilize agglomeration technology to form a high-density "compact detergent." Processes may employ agglomeration technology as a stand-alone system or in combination with a conventional spray tower. In an agglomeration process, the individual components of the final detergent product are brought together in a mixing-agglomerating vessel, where solid materials are mixed and a liquid binder is sprayed onto them. The resulting mixture is agitated and tumbled to form a free-flowing uniform granule. The agglomeration process can only tolerate a minimal amount of water or other liquid (binder) in the final product. This may limit the amount of detergent active in the final product. The "compact detergent" formulas may contain much greater concentrations of detergent actives, including compounds that are known to be heat sensitive. Therefore, it is convenient and advantageous to have a pure, dry detergent active for use in the agglomeration step.

The process of removing a solvent from a detergent paste in an effort to produce "pure" detergent actives (i.e. a concentrated detergent paste having less than 6 wt. % volatile solvent) is difficult because of the physical and thermal properties of concentrated detergents. As water or other solvents are removed from the detergent paste, the paste becomes increasingly viscous and therefore difficult to convey through a drying apparatus. Many detergent actives degrade when exposed to elevated temperatures for extended periods of time.

Processes for making nearly pure detergent actives have been expensive to perform and have required high capital costs. For example, a conventional process for producing pure detergent actives from concentrated paste utilizes a "wiped film evaporator." This expensive process equipment employs mechanical agitation to move the detergent active through the apparatus. A problem with certain wiped film evaporators is that they allow detergent to stagnate at the wall of the evaporator, causing a film of the detergent active to degrade.

SUMMARY OF THE INVENTION

It is an object of the invention to overcome one or more of the problems described above.

According to the invention, a method of removing solvents from a composition is provided wherein a solvent-containing composition is introduced into a channel of a dryer under pressure selected so as to avoid flashing or vaporizing of any of the components of the composition. As the composition advances through the channel, it is heated and the pressure is reduced, resulting in the flashing or vaporizing of selected components of the composition. The pressure drop across the channel and the volatilization of the solvent or solvents act as motive forces to convey the material along the channel. The resulting concentrate is collected at an outlet of the channel.

Other objects and advantages of the invention will be apparent to those skilled in the art from the following detailed description taken in conjunction with the drawing and the appended claims.

DETAILED DESCRIPTION OF THE INVENTION

Drying processes according to the invention may be utilized in a variety of detergent making and other processes, not only to process to near dryness a wide range of detergent actives, but also to selectively remove certain components from detergent-based pastes and other types of solvent-containing compositions. "Composition" is defined herein to include solutions, suspensions, dispersions or slurries, and emulsions of one or more components in one or more solvents.

In a process of the invention, a detergent paste initially may be heated to a temperature above the equilibrium vapor pressure of the paste at the operating pressure of a channel of a dryer. The paste is therefore transported to the dryer channel or channels under pressure, so that the paste is in a single phase prior to solvent removal. The pressurized paste is then injected into a channel where the pressure is allowed to drop, causing volatile components of the paste to vaporize or flash. The vapor liberated from the paste and the pressure drop across the dryer channel then propel the remaining paste through the channel as a dispersed liquid in a continuous vapor phase. Additional steam or other vapor or vapor-generating means may be injected into the channel to increase the motive force to propel the paste down the channel. As the paste moves down the channel, heat is transferred through the wall surrounding the channel and more volatile components are vaporized. The resulting concentrated detergent paste is collected at an outlet of the channel.

Figure 1:
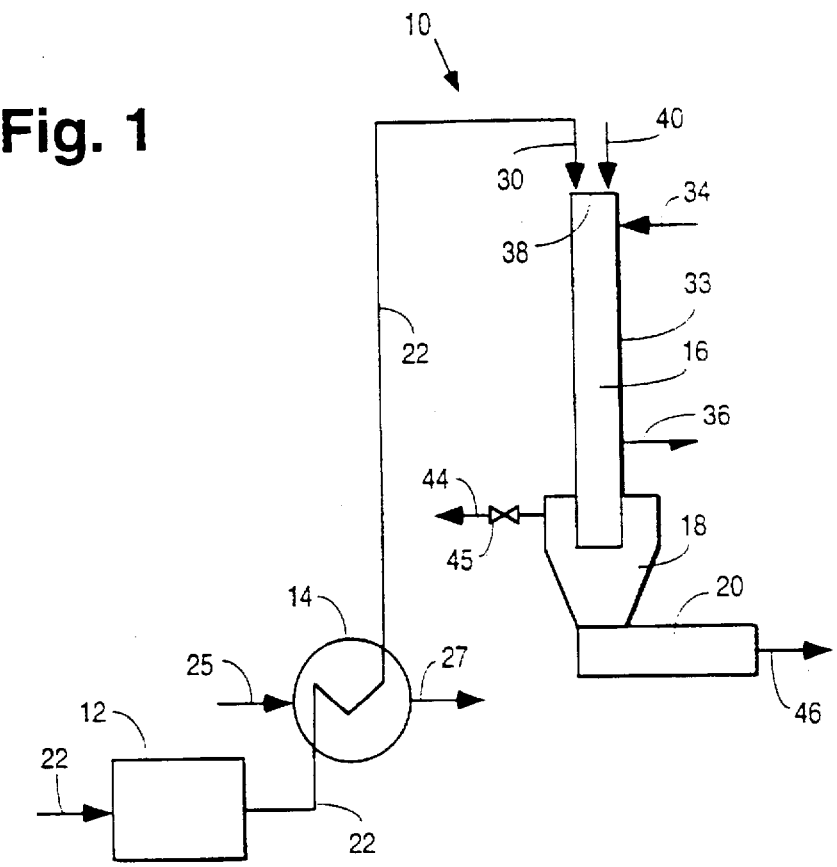
FIG. 1 is a process flow diagram illustrating a solvent removal system for use in the process according to the invention.
Figure 2:
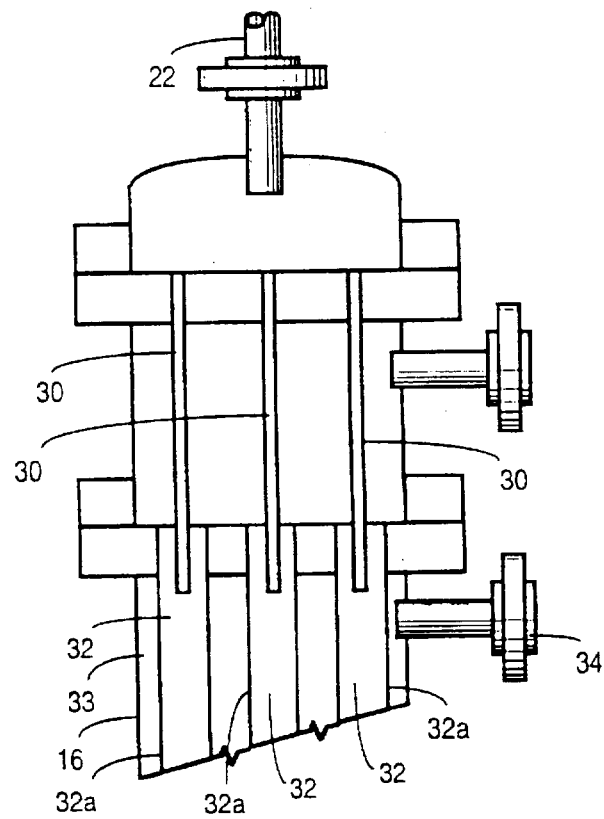
FIG. 2 is a partial, sectional view of a solvent removal apparatus for use in the process according to the invention.

A process according to the invention is further illustrated in FIG. 1 by a solvent removal system generally designated 10 comprising an inlet pump 12, a pre-heater 14, a dryer 16, a collection vessel 18 and an outlet means such as a plodder, extruder or pump 20. FIG. 2 depicts the dryer 16 and other portions of the system 10 in greater detail.

For example, a detergent paste enters the system 10 through a conduit 22 and is pumped to the pre-heater 14 by the pump 12. The detergent paste may contain from between about 4 to 80 wt. % water. It may also contain other solvents, such as alcohol in an amount of up to 40 wt % or more, or volatile trace contaminates. The pump 12 meters the paste through the pre-heater 14 where the detergent paste is typically heated to between about 50° C. and about 160° C. (or higher, if necessary) so that the paste is at a selected temperature. The pre-heater 14 may be a heat exchanger wherein heating fluid enters the exchanger through a conduit 25 and exits the exchanger through a conduit 27.

The conduit 22 through which the heated paste travels must be kept under pressure so that no paste components flash in the conduit 22. The restriction to the paste solution flow which maintains the solution under pressure may be supplied by an injection tube 30, and preferably by a plurality of injection tubes 30 through which the paste flows immediately prior to entering the dryer 16. The injection tube or tubes 30 are designed to supply the required back pressure to prevent flashing in the conduit 22. For example, an injection tube 30 may have an inside diameter ranging from about 0.06 inch to the diameter of a channel of the dryer 16 to which the injection tube is connected. When a plurality of injection tubes 30 are utilized, the back pressure also insures a uniform distribution of the paste between the tubes.

As the detergent paste moves down the injection tube or tubes 30, the pressure is reduced and certain components of the paste begin to flash. The vapor liberated during this flashing acts as a motive force to move the increasingly viscous material down into the dryer 16. The pressure of the dryer 16 is selected by controlling a vent 44 with control means such as a valve 45 so that the desired vaporization occurs.

The detergent paste is introduced into a channel or channels 32 of the dryer 16 via the injection tube or tubes 30. Each dryer channel is in the form of a conduit, for example a tube 32a, having a flow path (the channel 32) connected to a flow path of an injection tube 30. Each dryer tube 32a preferably has an inside diameter of between about 0.31 inch and 1 inch and is about 10 feet to about 30 feet in length (preferably about 20 feet in length). Preferably, the dryer 16 includes a plurality of dryer tubes 32a oriented in a bundle and surrounded by a heat exchange means, such as a jacket 33. Heat transfer material, such as steam, flows into the jacket 33 through a conduit 34 and out of the jacket through a conduit 36.

At an inlet area 38 of the dryer 16, steam or other vapor or vapor-generating materials may be injected into the dryer 16 via a conduit 40 to increase motive force to propel the ever more viscous detergent paste down each of the dryer tubes in the dryer 16. As the paste moves down the dryer tube or tubes 32a, heat transferred through the wall of the tube or tubes 32a vaporizes the volatile components of the detergent paste. The velocity of the liquid/vapor paste mixture increases as the vapor is liberated and the pressure drops. The propellent (including the flashing components and steam or other propellent added at 40) and the particles of the detergent paste mix to form the process fluid. Since the process can be operated at various pressures, typically under vacuum by controlling the flow of the vapor through the vent 44, the gas velocity exiting the dryer tube(s) is typically between about 50 feet/second and about 1500 feet/second. The high process fluid velocities and turbulent flow in the dryer tubes maximize the heat transfer through the walls of the tubes.

As the process fluid leaves the dryer 16, the vapor and concentrated detergent particles are separated. The vapor is taken through the vent 44 and possibly to a vacuum system (not shown). The pressure of the dryer 16 is selected by controlling the pressure of the vent 44. The concentrated detergent paste is collected in the vessel 18 at the bottom the dryer tube(s) and is removed from the vessel 18 through an outlet conduit 46 utilizing a pump, plodder, extruder or other device 20.

From the outlet conduit 46, the concentrated dry detergent or detergent paste may be processed in various ways known in the art to produce a final product. Pure or nearly pure detergent actives in the form of granules, flakes, or pellets may be continuously processed and conditioned, if required, to improve handling properties. The conditioned granules can then be ground and admixed with other materials in various grinding-mixing-agglomeration methods to form a finished compact detergent granule of desired composition and properties.

The above-described dryer tube or tubes are only one embodiment of the equipment that may be utilized in the inventive process. An equivalent process utilizes conduits having the same or similar effective diameters.

The drying processes according to the invention may be utilized to form concentrated detergent pastes from feed material having a wide range of viscosities. For example, the feed material into the dryer 16 may range from a thin paste (approximately 10 centipoise) to a very thick paste (approximately 100,000 centipoise). As the water and/or other solvents are removed from the detergent paste, the viscosity of the detergent paste is of course increased.

The material discharged from the dryer 16 is either a solid or a very viscous molten plastic. Because vapor being liberated during the process and the pressure drop in the dryer provide the dual functions of propelling the viscous paste down a dryer tube and of increasing the heat transfer rate to the detergent paste, the inventive process is advantageous because it alleviates the need for costly conventional process equipment for conveying the detergent paste through the drying system and agitating the paste to provide adequate heat transfer.

The high process fluid velocities resulting from the inventive drying process also minimize the average residence time of the detergent active in the dryer 16 and therefore prevent the formation of stagnant or slow moving films, thereby minimizing degradation due to processing at elevated temperatures for extended periods of time. Furthermore, the dryer tube can be maintained below its degradation temperature by controlling the dryer tube pressure, typically operated under vacuum. Because of the high process fluid velocity and the operating pressure, the temperature of the heat transfer surface of the dryer jacket can be increased, which in turn increases the heat transfer rate to the detergent paste.

Another advantage of the inventive process is its flexibility. The temperature, pressure and amount of additional vapor or vapor-generating materials injected in the drying system 10 may be selected to remove a single solvent from a paste. This may be desirable, for example, in the processing of sodium alpha sulfo methylester, which may be produced utilizing a low molecular weight alcohol, such as methanol. A drying process according to the invention may be utilized to selectively remove the methanol from the detergent paste. The methanol may then be recycled to the methylester sulfonating process and the semi-molten active paste leaving the dryer may be utilized as a feed stream to a spray tower crutcher or as a feed stream to a liquids blending operation to form a liquid detergent.

The drying processes according to the invention may also be utilized to form other types of concentrates. For example, processes according to the invention include, but are not limited to, the removal of a solvent or solvents from solutions, such as the drying of an inorganic salt (or salts) in water solution (e.g., the drying of ammonium chloride and sodium sulfate). Processes according to the invention may also be used to remove a solvent or solvents from a solution containing an organic salt.

Processes according to the invention may be utilized to remove solvents from dispersions or slurries, including the drying of crutcher mixes for spray towers. A method according to the invention may be used for concentrating waste slurries (e.g., solvent removal from a metal sludge from a plating line).

Furthermore, solvents may be removed from emulsions in processes according to the invention (e.g., drying milk).

Finally, processes according to the invention may be utilized to remove solvents from compositions which do not readily fit into the categories of solution, dispersion or slurry, and emulsion discussed herein. For example, processes according to the invention may be used for drying soap.

The invention is further described and illustrated by the following detailed examples which are not intended to be limiting.

EXAMPLE 1

Concentration of Sodium Alpha Sulfo Methylester (SASME)

The Detergent Feed

A sulfonation process was performed to prepare an anionic detergent active by reacting a liquid methylester with $SO_3$ to form a sulfonic acid. Because the sulfonic acid-containing product resulting from the process is dark in color and therefore undesirable for commercial use, it was bleached with hydrogen peroxide. Methanol was added to the reaction mixture during the bleaching process. The bleached produce was then neutralized with sodium hydroxide. The detergent paste included 9.0 wt. % methanol and 17.6 wt. % water.

The Process Equipment

A jacketed dryer 12 having a single 0.44 inch drying tube was utilized for the experiment. The dryer tube was 18 feet 2 inches (18'2") in length and made from stainless steel.

The Process

About 58 lb/hr of SASME paste was heated to about 320° F. (160° C.) and flashed into the dryer tube. The pressure at the top of the dryer tube was 12 psia and the pressure at the discharge of the dryer tube was 1.2 psia. A jacket surrounding the tube was supplied with trapped 100 psig steam. As the paste exited the tube the liquid/vapor temperature was about 147° F. (64° C.).

The detergent paste exiting the dryer contained 0.3% methanol and 2.6% water. Of the 10,500 BTU/hr needed to vaporize the water and methanol, approximately 8,000 BTU/hr (75%) was transferred through the wall of the dryer tube.

The calculated vapor velocity at the discharge of the tube was 931 feet/second. As the concentrated SASME paste exited a plodder located at the outlet of the tube, the paste was forced through a plate perforated with ¼" holes. The molten material was cooled using air. After cooling, the extrudites were broken into uniform pellets and stored in sealed containers.

EXAMPLE 2

Concentration of SASME

An SASME paste prepared according to the process described in Example 1 having about 13 wt. % methanol and about 16.5 wt. % water was utilized for this example. The jacketed dryer tube and plodder described with respect to Example 1 also was utilized.

About 57 lb/hr of the SASME paste was heated to about 187° F. (86° C.) and then flashed into the jacketed dryer tube. The pressure at the top of the dryer tube was 14.7 psia and the pressure at the discharge of the tube was 1.2 psia. The jacket of the tube was supplied with trapped 100 psig steam. As the paste exited the tube, the liquid/vapor temperature was about 135° F. (57° C.).

The paste exiting the dryer tube contained about 0.5 wt. % methanol and about 4.6 wt. % water. Of the 10,100 BTU/hr required to vaporize the water and the methanol, approximately 9800 BTU/hr (98%) was transferred through the wall of the tube. The calculated vapor velocity at the discharge of the tube was 830 feet/second.

As the concentrated SASME exited the plodder, it was forced through a plate perforated with ⅛ inch holes. The molten material was cooled using air. After cooling, the extrudites were broken into uniform pellets and stored in sealed containers.

EXAMPLE 3

Solvent Removal in SASME

An SASME paste prepared according to the process described in Example 1 having about 13 wt. % methanol and about 15.5 wt. % water was utilized for this example. The jacketed dryer tube described with respect to Example 1 also was utilized.

About 31 lb/hr of the SASME paste was heated to about 158° F. (70° C.) and then flashed into the jacketed dryer tube. The pressure at the top of the dryer tube was 27.7 psia and the pressure at the discharge of the tube was 10.8 psia. The jacket of the tube was supplied with trapped 100 psig steam. As the paste exited the tube, the liquid/vapor temperature was about 203° F. (95° C.).

The paste exiting the dryer tube contained about 0.5 wt. % methanol and about 12.5 wt. % water. The almost methanol-free SASME was removed from the flash vessel as a pumpable paste easily handled at elevated temperatures.

EXAMPLE 4

Concentration of Sodium Linear Alkylbenzene Sulfonate

The jacketed dryer tube and plodder described with respect to Example 1 was utilized for this example. Sodium linear alkylbenzene sulfonate paste having about 15.5 wt. % water also was utilized for this example.

About 60 lb/hr of $C_{12.5}$ sodium linear alkylbenzene sulfonate paste was heated to about 361° F. (183° C.) and then flashed into the jacketed dryer tube. The pressure at the top of the dryer tube was 21 psia and the pressure at the discharge of the tube was 2 psia. The jacket of the tube was supplied with trapped 100 psig steam.

The paste exiting the dryer tube contained about 3 wt. % water.

As the concentrated $C_{12.5}$ sodium linear alkylbenzene sulfonate paste exited the plodder, it was forced through a plate perforated with 1/16 inch holes. The molten material was then co-extruded with 5% sodium tripolyphosphate, yielding a flowable pellet.

EXAMPLE 5

Concentration of Sodium Alcohol Sulfate

The jacketed dryer tube and plodder described with respect to Example 1 was utilized for this example. Sodium alcohol sulfate paste having about 21 wt. % water also was utilized for this example.

About 64 lb/hr of $C_{12-14}$ alcohol sulfate paste was heated to about 250° F. (121° C.) and then flashed into the jacketed dryer tube. The pressure at the top of the dryer tube was 5.4 psia and the pressure at the discharge of the tube was 1.2 psia. The jacket of the tube was supplied with trapped 44 psig steam.

The paste exiting the dryer tube contained about 4.5 wt. % water.

As the concentrated $C_{12-14}$ alcohol sulfate paste exited the plodder, it was forced through a plate perforated with 1/16 inch holes. The pellet was then cooled with air to form a stable free-flowing pellet.

EXAMPLE 6

Drying a Solution of Ammonium Chloride and Water

The jacketed dryer tube described with respect to Example 1 was utilized for this example. A 24% ammonium chloride solution was utilized for this example.

About 35 lb/hr of the 24% ammonium chloride solution was heated to 151° C. and flashed into the jacketed dryer tube. The pressure at the top of the dryer tube was 4.6 psia and the pressure at the discharge of the tube was 1.2 psia. The jacket of the tube was supplied with trapped 100 psig steam.

The paste entered the process with 76% water and exited with 0.5% water. The resulting concentrate formed a fine powder and was separated from the water vapor using a cyclone separator. The material was discharged from the cyclone with a star valve and collected in a bag.

EXAMPLE 7

Drying a Solution of 2-Hydroxyethane Sulfonate and Water

The jacketed dryer tube described with respect to Example 1 was utilized for this example.

About 40 lb/hr of 2-Hydroxyethane sulfonate (NIS) was heated to 140° C. and flashed into the jacketed dryer tube. The pressure at the top of the dryer tube was 9 psia and the pressure at the discharge of the tube was 1.5 psia. The jacket of the tube was supplied with trapped 100 psig steam.

The paste entered the process with 76% water and exited with 0.45% water. This material formed a fine powder and was separated from the water vapor using a cyclone separator. The material was discharged from the cyclone with star valve and collected in a bag.

The foregoing detailed description is given for clearness of understanding only, and no unnecessary limitations should be understood therefrom, as modifications within the scope of the invention will be apparent to those skilled in the art.

We claim:

1. A process for removing solvents from a detergent paste comprising:
    (a) providing a dryer having an inlet and at least one channel;
    (b) preheating a detergent paste to a temperature to result in flashing of at least one of the components of the paste at an operating pressure of an inlet of the channel and applying pressure to the paste to avoid vaporization of any of the components of the paste;
    (c) pumping the detergent paste to the dryer inlet under a pressure sufficient to avoid flashing of any of the components of the paste;
    (d) introducing the paste into the channel at said operating pressure of the channel inlet;
    (e) supplying heat to the paste in the channel and reducing the pressure along the channel resulting in the further flashing of at least one component of the paste wherein vapor liberated during the flashing acts as a motive force to move the increasingly viscous paste along the channel; and
    (f) collecting a resulting detergent concentrate at an outlet of the channel.

2. The process according to claim 1 comprising preheating the detergent paste to a temperature of between about 50° C. and about 160° C. prior to introducing the paste into the channel.

3. The process according to claim 1 including injecting a vapor into the channel during step (d).

4. The process according to claim 3 wherein the vapor is steam.

5. The process according to claim 1 wherein the detergent paste comprises water and alcohol and wherein the temperature and pressure are selected during step (e) to selectively remove alcohol from the detergent paste.

6. The process according to claim 1 wherein the detergent paste comprises water and alcohol and wherein the temperature and pressure are selected during step (e) to selectively remove alcohol and water from the detergent paste.

7. The process according to claim 1 wherein the dryer includes a plurality of channels and the detergent paste is introduced into each of the channels for processing according to steps (d) through (f).

8. The process according to claim 1 wherein the step of supplying heat to the paste in the channel is performed by indirect heat exchange.

9. The process according to claim 8 further comprising providing a jacket through which steam flows said jacket being disposed adjacent to the channel to provide the indirect heat exchange to the paste in the channel.

10. A process for producing a detergent comprising:

(a) preparing a detergent paste;

(b) providing a dryer having an inlet and at least one channel;

(c) preheating the detergent paste to a temperature to result in flashing of at least one of the components of the paste at an operating pressure of an inlet of the channel, said temperature being between about 50° C. and about 160° C. and applying pressure to the paste to avoid vaporization of any of the components of the paste;

(d) pumping the detergent paste to the dryer inlet under a pressure sufficient to avoid flashing of any of the components of the paste;

(e) introducing the paste into the channel at said operating pressure of the channel inlet;

(f) supplying heat to the paste in the channel and dropping the pressure along the channel, resulting in the further flashing of at least one component of the paste wherein vapor liberated during the flashing moves the paste along the channel; and (g) collecting a resulting detergent concentrate at an outlet of the channel.

11. The process according to claim 10 including injecting a vapor into the channel during step (e).

12. The process according to claim 11 wherein the vapor is steam.

13. The process according to claim 10 wherein the detergent paste prepared in step (a) comprises water and alcohol and wherein the temperatures and pressures are selected during steps (c) through (f) to selectively remove alcohol from the detergent paste.

14. The process according to claim 10 wherein the detergent paste prepared in step (a) comprises water and alcohol and wherein the temperature and pressure are selected during step (f) to remove alcohol and water from the detergent paste.

15. The process according to claim 10 wherein the dryer includes a plurality of channels and the detergent paste is introduced into each of the channels for processing according to steps (e) through (g).

* * * * *